(12) United States Patent
Florez Choque et al.

(10) Patent No.: US 11,308,421 B2
(45) Date of Patent: Apr. 19, 2022

(54) LEARNING: LEARNING DESIGN POLICIES BASED ON INTERACTIONS

(71) Applicant: Capital One Services, LLC, McLean, VA (US)

(72) Inventors: Omar Florez Choque, McLean, VA (US); Anish Khazane, McLean, VA (US); Alan Salimov, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 33 days.

(21) Appl. No.: 16/252,846

(22) Filed: Jan. 21, 2019

(65) Prior Publication Data

US 2020/0234178 A1   Jul. 23, 2020

(51) Int. Cl.
*G06N 20/00* (2019.01)
*G06N 7/00* (2006.01)

(52) U.S. Cl.
CPC ............. *G06N 20/00* (2019.01); *G06N 7/005* (2013.01)

(58) Field of Classification Search
CPC ................................ G06N 20/00; G06N 7/005
See application file for complete search history.

(56) References Cited

U.S. PATENT DOCUMENTS

| | | | | |
|---|---|---|---|---|
| 2015/0179170 A1* | 6/2015 | Sarikaya | ................. | G10L 15/22 704/275 |
| 2017/0308535 A1* | 10/2017 | Agarwal | ................ | G06N 7/005 |
| 2018/0165581 A1* | 6/2018 | Hwang | ................... | G06F 3/167 |
| 2018/0181922 A1* | 6/2018 | Choi | ................... | G06F 11/3438 |
| 2018/0232435 A1* | 8/2018 | Papangelis | ............. | G06N 5/027 |
| 2018/0322462 A1* | 11/2018 | Jayaraman | ............ | G06F 17/243 |

OTHER PUBLICATIONS

Fehrle et al. ("Generating Pictorial Presentations for Advice-Giving Dialog Systems", In: Gorny P. Tauber M.J. (Eds) Visualization in Human-Computer Interaction. IPsy 1988. Lecture Notes in Computer Science, vol. 329, 1990, pp. 27-36) (Year: 1990).*

(Continued)

*Primary Examiner* — Miranda M Huang
*Assistant Examiner* — Robert Lewis Kulp
(74) *Attorney, Agent, or Firm* — Kacvinsky Daisak Bluni PLLC

(57) ABSTRACT

Systems, methods, and articles of manufacture for learning design policies based on user interactions. One example includes determining a first task for an environment, receiving data from a plurality of data sources, determining a first time step associated with the received data, determining a plurality of candidate actions for the determined first time step, computing a respective probability value of each candidate action achieving the first task at the first time step based on a first machine learning (ML) model, determining that a first candidate action has a greater probability value for achieving the first task at the first time step relative to the remaining plurality of candidate actions, determining that the first candidate action has not been implemented in the environment at the first time step, and generating an indication specifying to implement the first candidate action as part of a policy to achieve the first task.

20 Claims, 9 Drawing Sheets

(56) References Cited

OTHER PUBLICATIONS

Nieters, Jim., "Defining an Interaction Model: The Cornerstone of Application Design" UX Matters, Jan. 23, 2017, https://www.uxmatters.com/mt/archives/2012/01/defining-an-interaction-model-the-cornerstone-of-application-design.php.
Dabek, F., Caban J., "A Grammar-based Approach for Modeling User Interactions and Generating Suggestions During the Data Exploration Process.", IEEE Transactions on Visualization and Computer Graphics (vol. 23, Issue: 1, Jan. 2017) Published Aug. 5, 2016, pp. 41-50 (Abstract).
Tîmăucă, C., Duque, R., Montaña, J., "User Interaction Modeling and Profile Extraction in Interactive Systems: A Groupware Application Case Study", Sensors, vol. 17(7), National Center for Biotechnology Information—US National Library of Medicine—National Institutes of Health—Jul. 2017.
Lee, J-J., McCartney, R., Santos Jr., E., "Learning and Predicting User Behavior for Particular Resource Use", FLAIRS-01 Proceedings, 2001, AAAI, 5 pages.
Vieira, Armando., "Predicting Online User Behavior Using Deep Learning Algorithms", arXiv:1511.06247v3 [cs.LG] May 26, 2016, 21 pages.
G. Fenu and P. L. Pau, "Modeling user interactions for conversion rate prediction in M-Commerce," 2015 IEEE Symposium on Computers and Communication (ISCC), Larnaca, 2015, pp. 309-314. doi: 10.1109/ISCC.2015.7405533 (Abstract) URL: http://ieeexplore.ieee.org/stamp/stamp.jsp?tp=&arnumber=7405533&isnumber=7405441.

\* cited by examiner

LEARNING: LEARNING DESIGN POLICIES BASED ON INTERACTIONS

TECHNICAL FIELD

Embodiments herein generally relate to design learning, and more specifically, to learning design policies based on interactions.

BACKGROUND

Design thinking is a methodology that structures a process to design and build experiences based on user interactions. For example, design thinking may be used to design web pages, applications, processes, and workflows. However, by its nature, design thinking is slow, hard to replicate across teams, and difficult to scale to large numbers of users. Furthermore, design learning generates large amounts of handwritten documentation, which is difficult to organize and digitize for use by computing algorithms. Many times, experienced users are required to interpret and explain the hypotheses generated by design learning.

SUMMARY

Embodiments disclosed herein include systems, methods, and computer program products to learn design policies based on interactions. One example may include determining a first task, of a plurality of tasks, for an environment, the environment comprising one or more of a computing environment and a real-world environment, the first task relative to one or more of the computing environment and the real-world environment, receiving data from a plurality of data sources, the received data comprising audio data, image data, application data, and text data, determining a first time step associated with the received data, determining a plurality of candidate actions for the determined first time step, computing a respective probability value of each candidate action achieving the first task at the first time step based on a first machine learning (ML) model applied to the received data, the first ML model trained based on training data labeled to specify whether the corresponding training data achieves each of the plurality of tasks, determining that a first candidate action of the plurality of candidate actions has a greater probability value for achieving the first task at the first time step relative to the probability values of the remaining plurality of candidate actions, determining that the first candidate action has not been implemented in the environment at the first time step, and generating, by operation of a processor circuit, an indication specifying to implement the first candidate action at the first time step as part of a policy to achieve the first task.

DETAILED DESCRIPTION

Figure 1:
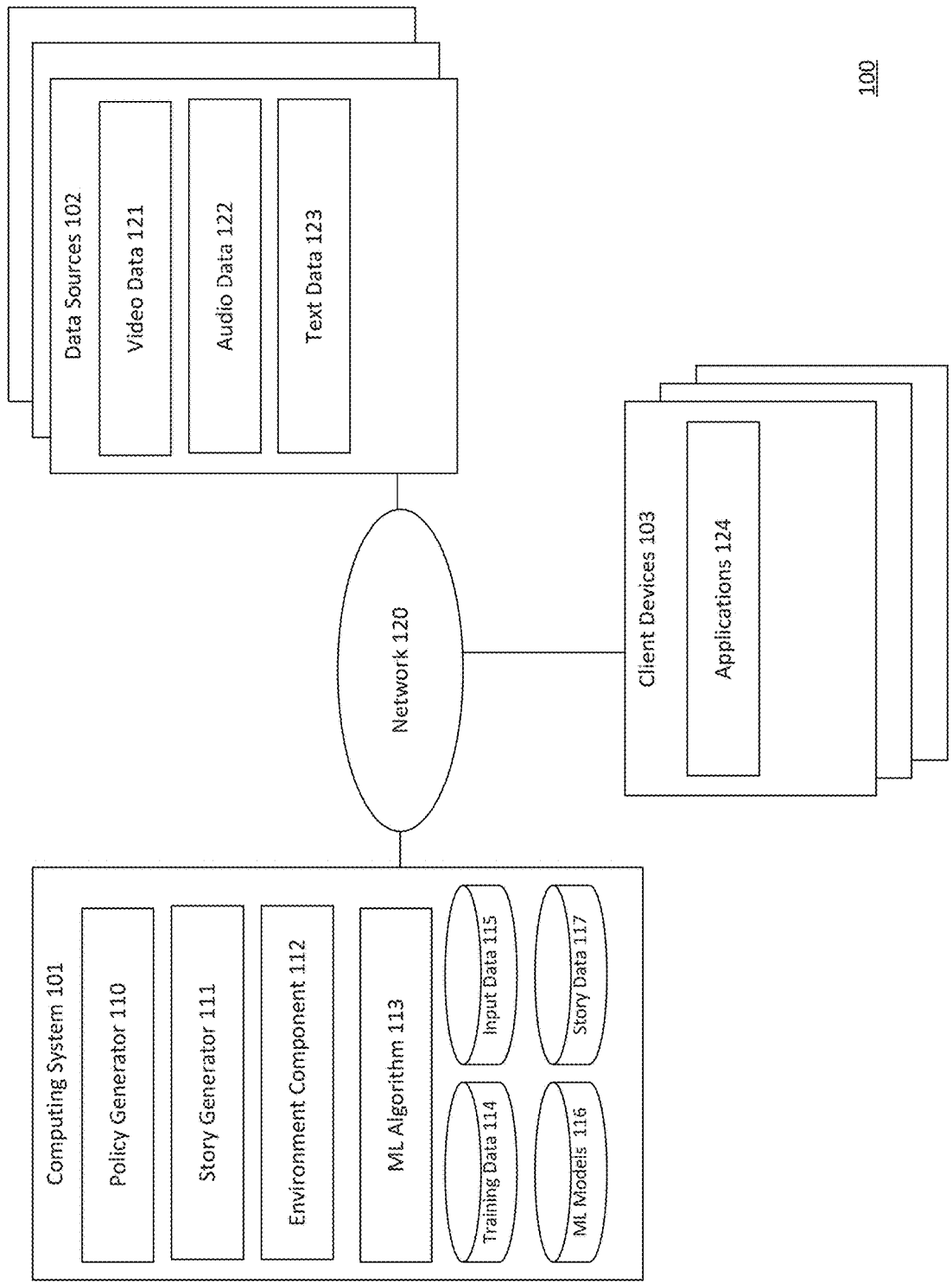
FIG. 1 illustrates an embodiment of a system.

Embodiments disclosed herein provide solutions that reduce the complexity associated with design learning. More specifically, embodiments disclosed herein train machine learning (ML) algorithms that model the interactions between users, entities, and their environments (including real-world environments and/or computing environments). The models generated by the ML algorithms can be used to predict the optimal sequence of actions needed to complete a task (e.g., a solution design) and narrate the execution of the optimal sequence of actions (also referred to as storytelling). The story-telling narration may include textual and/or graphical elements.

Embodiments disclosed herein represent a problem as a task (also referred to as a goal), and a sequential solution as the sequential instantiation of a policy, with the desired outcome to find the optimal policy (or sequence of actions) to complete a task in an environment (e.g., a real-world environment such as a bank, a computing environment such as a banking application, virtualization platform, etc.). For example, the task may specify to determine the optimal layout of a webpage, assign financial advisors to customers, and/or design the optimal layout of offices and personnel in a physical bank location.

Furthermore, embodiments disclosed herein track the state of interactions in different environments using different data sources. For example, the data sources may include video cameras, digital cameras, microphones, computing systems, chat transcripts, the log files of a web page or web server, and the like. A user may interact with the design learning solution by executing an action, which changes the state of the actors in the environment, and generates a positive and/or negative reward to the agent as an output. The reward may depend on the quality of the actions taken by the agent towards the completion of a task. For example, a larger reward may be generated for actions that complete a task (or contribute to completion of the task) relative to the rewards generated for actions that do not complete a task (or contribute to the completion of the task).

Further still, embodiments disclosed herein narrate a story which describes, in natural language and/or graphical objects, the optimal policy to solve a problem given the actor interactions in an environment. Doing so translates predictive patterns into a readable message that can be implemented by users and/or computing systems to integrate the solutions into new and/or existing systems and/or environments. Advantageously, embodiments disclosed herein require minimal user intervention. In contrast to supervised learning techniques, an interaction-based solution includes many more events linked to using different systems, few of which may lead to successful task completions.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 depicts a schematic of an exemplary system 100, consistent with disclosed embodiments. As shown, the system 100 includes at least one computing system 101, one or more data sources 102, and one or more client devices 103 connected via a network 120. Generally, the system 100 is configured to train machine learning (ML) models to learn policies that define the solution of a problem based on user interactions. In at least one embodiment, a policy is a statistical distribution over the actions that a user might perform while interacting with a real-world environment (e.g., during a visit to a bank) and/or a computing environment (e.g., interacting with a computing application 124 on a client device 103). The computing system 101 is representative of any type of computing system or device, such as a server, compute cluster, cloud computing environment, and virtualized computing system. The data sources 102 are representative of any type of data source, such as computing systems, cameras, microphones, and the like. The client devices 103 are representative of any type of computing device, such as desktop computers, laptops, smartphones, tablets, and the like.

As shown, the computing system 101 includes a policy generator 110, story generator 111, environment component 112, a machine learning (ML) algorithm 113, a data store of training data 114, a data store of input data 115, a data store of ML models 116, and a data store of story data 117. The policy generator 110 learns policies that include an optimal sequence of actions that can be used to complete a task in a real-world environment and/or a computing environment. A task may include any number and type of desired objectives, such as achieving customer satisfaction, improving the performance of a computing system and/or computing application, completion of a task, improving a workflow, a goal, receiving positive reviews from customers, receiving bank deposits, opening new customer accounts, designing workflows, designing retail locations, staffing retail locations, designing user interfaces (UIs) for applications, etc. In at least one embodiment, users may define one or more tasks.

The policy generator 110 learns such policies based on the ML algorithm 113 (which may be an artificial neural network (ANN) algorithm) and the training data 114 during a training phase associated with completion of a task. The training data 114 includes any number and type of data, such as user actions, user interactions, audio data, video data, image data, text data, and data generated by applications. Each element of data in the training data 114 is labeled to indicate whether the element of data (or combinations of data elements) successfully led to the completion of the corresponding task. Each element of training data 114 may include a label for any number of tasks that are the subject of the training. In some embodiments, a user may label the data in the training data 114. For example, the user may label an online chat transcript between two human users to indicate that conversations between human users successfully led to resolution of a customer complaint. As another example, a user may label an online chat transcript between one human user and a computerized bot to indicate that conversations between a customer and the bot did not successfully lead to the resolution of a customer complaint.

Generally, during the training phase, the policy generator 110 uses the ML algorithm 113 to identify relevant features (or combinations of features) of data in the training data 114 that lead to the completion of the associated task. The policy generator 110 may also learn features that are relevant to determining whether an action will be performed in the environment (e.g., a user selecting a user interface element in an application, a user performing a transaction, etc.). The ML models learned by the policy generator 110 during training may be stored in the ML models 116. Therefore, the ML models 116 learned by the policy generator 110 may include a plurality of actions, each action having an associated probability value reflecting the degree to which the action, and/or combinations of actions, leads to the completion of a task. Continuing with the previous example, therefore, the ML models 116 generated by the policy generator 110 may include a greater probability value for chats between humans relative to the probability value for chats between a human and a bot, where the probability values reflect the likelihood of resolving customer complaints.

The story generator 111 receives one or more ML models 116 generated by the policy generator 110 to generate a human-readable narration of the optimal policy in natural language and/or graphical symbols, which may be stored as a story in the story data 117. Generally, the story generator 111 may leverage natural language processing algorithms to generate the narration of the optimal policy. Furthermore, the story generator 111 may leverage associations between natural language concepts and graphical symbols to generate the story.

In at least one embodiment, the policy generator 110 and story generator 111 are artificial neural network (ANN) models. However, in other embodiments, the policy generator 110 and/or story generator 111 may be other types of ML models. Generally, an ANN is an algorithm that receives observations as input and aims to approximate a function with non-linear transformations of the observations while minimizing a measure of error. Therefore, in the context of the present disclosure, the policy generator 110 minimizes a measure of error corresponding to the optimal sequence of actions (or interactions) that lead to the completion of a desired task in a real-world environment and/or a computing environment.

The policy generator 110 may be represented as a function Q(s, α), which learns policies that represent the best sequence of actions 'α' that lead to the completion of a task. The sequential decision process estimates the best action 'α' in each time step 't'. Intuitively, every user interaction with a real-world environment and/or computing environment generates a reward signal 'r', and the policy generator 110 is configured to identify actions that maximize the probability of obtaining the largest sum of rewards over time. To give more preference to recent actions, the policy generator uses a discount reward parameter 'γ' that has an initial value (e.g., 0.99) which decreases over time after successive multiplications. The current state of the policy generator 110 is expressed by the variable 's', and is described in equation 1 below:

$$Q(s, a) = E_{s'}[r + \gamma \max_{a'} Q^*(s', a') \mid s, a] \quad \text{Equation 1}$$

The environment component 112 is configured to continuously receive video data 121, audio data 122, and text data 123 captured by the data sources 102, and optionally store the received data as the input data 115. The environment component 112 is further configured to provide the received data to the policy generator 110 and/or story generator 111 for further processing. The video data 121 is representative of any type of video data, such as video of a real-world environment, video of users interacting in the real-world environment, video of users interacting with computing devices, video of a computing environment (e.g., a recording of an application 124 executing on a client device 103), one or more images, and the like. The audio data 122 is representative of any type of audio data, such as audio captured by a microphone in the real-world environment, audio of a user interacting with a customer service agent, audio of a user interacting with a computing device, audio data generated by a computing application, audio call recordings, and the like. The text data 123 is representative of any type of hand-written, printed, and/or computer-generated text data. For example, the text data 123 includes hand-written notes, newspaper articles, log files of a web page, online chat transcripts, text data generated by an application 124 of the client device 103 (or another device), and the like.

During a runtime operation, the policy generator 110 may represent a problem as a task (or goal) and the solution as a sequential instantiation of a policy. Stated differently, the policy generator 110 may determine the optimal policy (which includes a sequential set of actions and/or decisions) to complete the task. During the runtime operation, the policy generator 110 receives input data from the data sources 102 (e.g., video data 121, audio data 122, text data 123, etc.). The policy generator 110 may then process the input data using the trained ML model 116 generated by the policy generator 110 during training. The processing may include extracting features from the input data (e.g., identifying objects in images, extracting concepts from text and/or speech, identifying user sentiment, etc.). The policy generator 110 may use the trained ML model 116 to compute probability values for each candidate action in the ML model 116 based on the input data and the features extracted from the data received from the data sources 102.

The output of the policy generator 110 may be a plurality of probability values reflecting, for each of the plurality of candidate actions, the likelihood that the candidate action will be taken, and whether the candidate action leads to the completion of the task at the current time. The policy generator 110 may repeat the process over a plurality of time steps (e.g., as additional data is received from the data sources 102 and/or actions are performed by an actor). Once completed, the policy generator 110 may identify the candidate actions having the greatest probability values towards the completion of a task for each time step. The policy generator 110 may then select one or more of the candidate actions having the greatest probability values for completing the task at each time step for inclusion in the policy for the task.

Once the policy is defined for a given task, the story generator 111 receives the policy and the ML model 116 trained by the policy generator 110 to generate the policy. The story generator 111 may then generate one or more natural language statements for each action specified in the policy to create a natural language narrative for the policy. The story generator 111 may further assign each action specified in the policy to a graphical symbol. The transition between each action in the policy is inferred by the story generator 111, and the result is a sequence of symbols and actions that are easy to interpret. The story generator 111 may then store the natural language narrative and sequence of graphical symbols as a story in the story data 117.

Figure 2A:
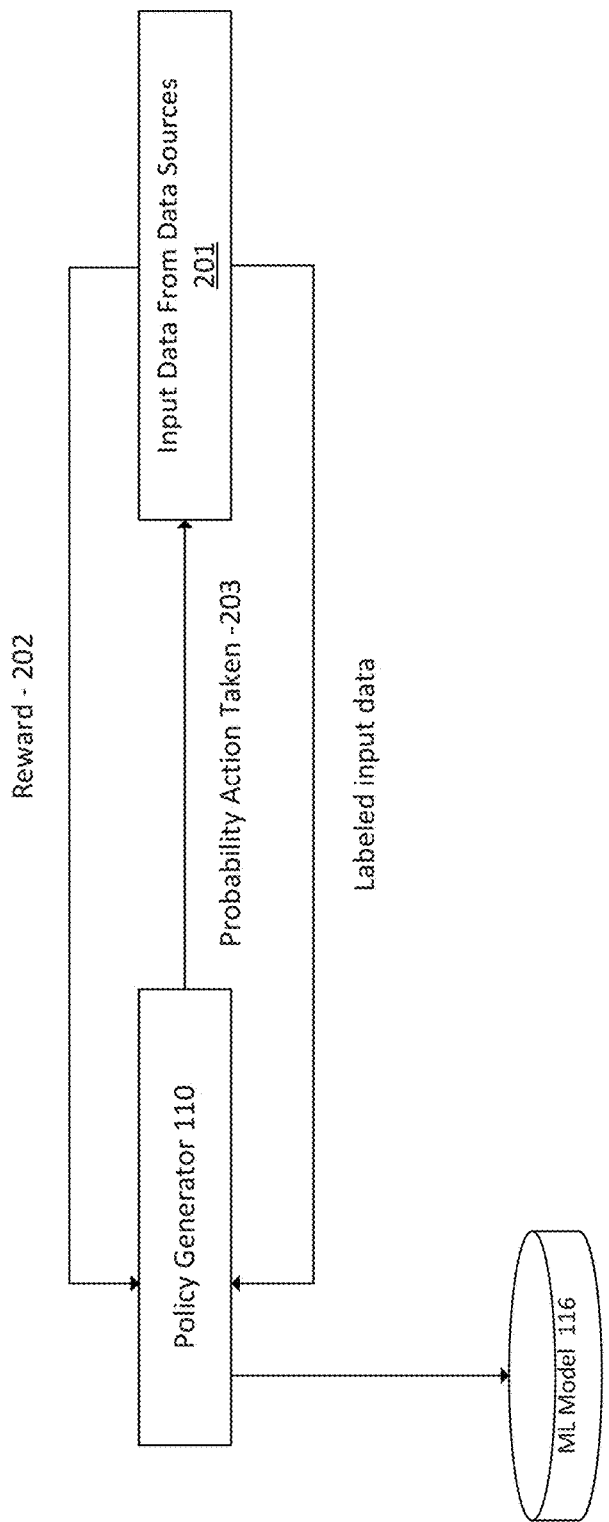
FIGS. 2A-2C illustrate examples for design learning.

FIG. 2A is a schematic 200 depicting example operations to train the policy generator 110 to generate an ML model 116, according to one embodiment. As shown in FIG. 2A, in block 201, the policy generator 110 receives input data 115 from the data sources 102 as training data. As stated, the input data received at block 201 may include images, video, audio, text, and/or application data. The input data may be labeled by a user indicating whether the input data leads to the completion of a task. The reward signal 202 reflects the current reward value γ at a given time. Using the training data, reward values, and the ML algorithm 113, the policy generator 110 generates a ML model 116. The training also allows the policy generator 110 to compute probability values 203 reflecting a probability of whether an action will be taken at a given point in time.

Figure 2B:
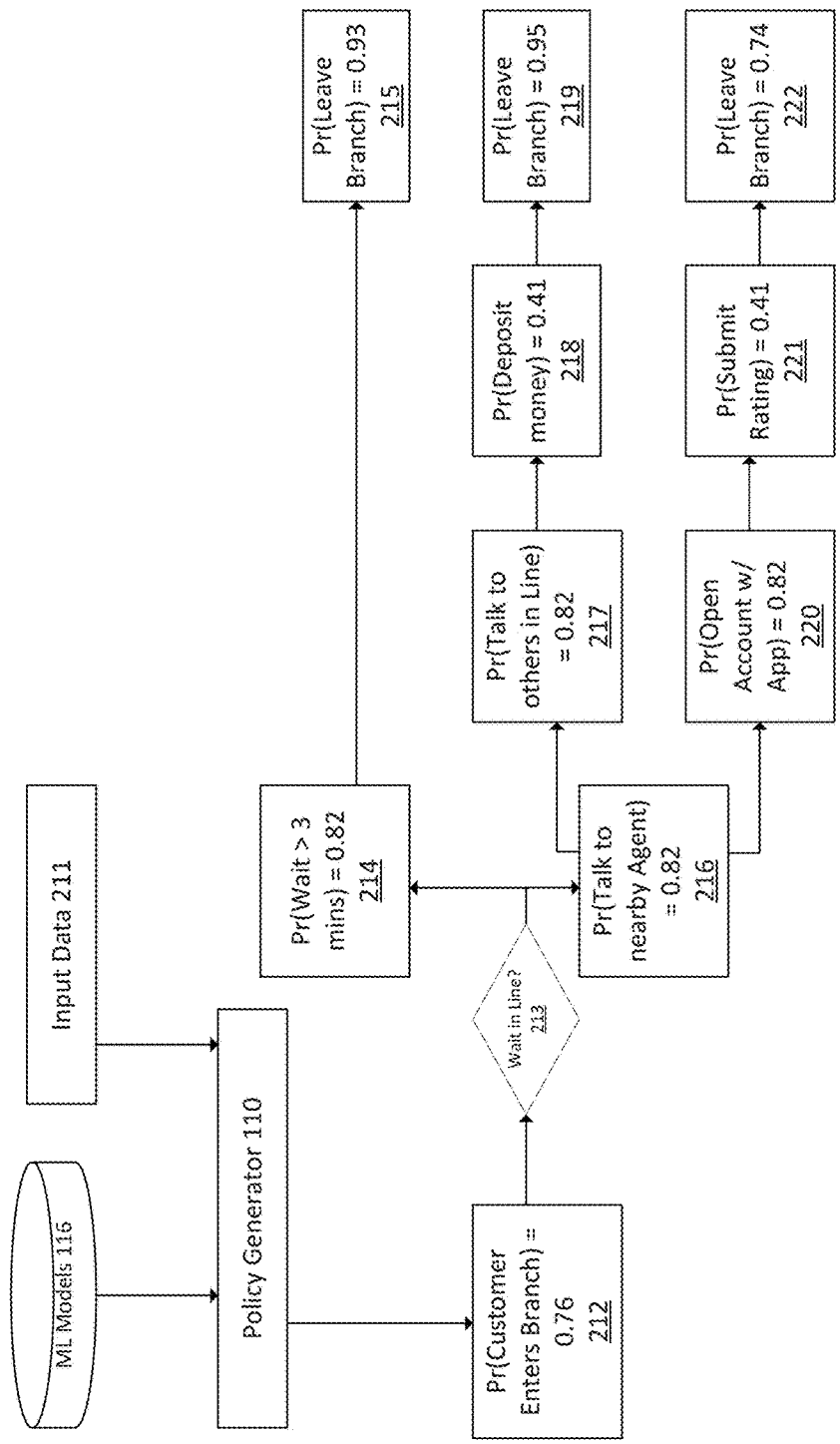

FIG. 2B is a schematic 210 depicting example runtime operations of the policy generator 110, according to one embodiment. As shown, the policy generator 110 receives a ML model 116 that was generated by the policy generator 110 during training for a task. The policy generator 110 also receives input data from the data sources 102 at block 211. As stated, the input data received at block 211 may include images, video, audio, text, and/or application data. Using the ML model 116 and the input data from the data sources, the policy generator predicts the sequence of actions that will take place in an environment given the current state of the environment. The example shown in FIG. 2B relates to a real-world environment, namely a branch of a bank. Embodiments are not limited in this context. Generally, for each block 212-222 in FIG. 2B, the policy generator 110 continues to receive input data from the data sources 102. Furthermore, at each block 212-222, the policy generator 110 computes probability values based on the ML model 116 and the received input data from the data sources 102. The probability values depicted in FIG. 2B may reflect the probability that an action is performed and/or a probability that the action, if performed, leads to completion of a task. In some embodiments, the policy generator 110 computes a first probability value reflecting whether an action is performed, and a second probability value that the action, if performed, leads to completion of a task. Embodiments are not limited to these contexts.

As shown, at block 212, the policy generator 110 computes a probability that a customer enters a branch. The policy generator 110 may generally identify the customer in video data 121 captured by a camera data source 102 near the exterior of the branch. As shown, the policy generator 110 computes a probability value of 0.76 (on a scale of 0.0 to 1.0). As stated, the probability value may reflect the probability that the customer enters the branch and/or a probability that the customer entering the branch leads to completion of a task. This leads to another state at block 212, where there are two possible actions, namely that the customer will wait in line for more than 3 minutes at block 214, or talk to a nearby agent while waiting in line at block 216. The policy generator 110 may determine the respective probabilities for blocks 214, 216, based on the ML model 116 and additional received input data (e.g., images reflecting how many people are currently in the bank, audio data reflecting a noise level in the bank, estimated wait times for lines in the bank generated based on historical wait time data, etc.).

As shown, the policy generator 110, based on the input data at the current time (e.g., after the customer has entered the branch), computes a probability value of 0.82 that the customer will wait for more than 3 minutes in line at block 214, and computes a probability value of 0.82 that the customer will speak to a nearby agent while waiting in line for block 216. At block 215, the policy generator 110 generates a probability value that the customer will leave the branch, e.g., based on the wait time of the customer exceeding 3 minutes, image data reflecting a number of people in the line, the customer's current position in line, etc.

Returning to block 216, the policy generator 110 identifies additional candidate actions, namely whether the customer waiting in line will talk to other customers in line at block 217, and whether the customer will open a new account with a smartphone app at block 220. As shown, the policy generator 110 computes a probability value of 0.82 that the customer will talk to other customers in line at block 217. For example, the audio data 122 captured by a microphone in the branch may reflect conversation among customers waiting in line. As such, the policy generator 110 may compute the probability value based at least in part on the audio data 222 at the time corresponding to block 217. At block 218, the policy generator 110 receives additional input data from the data sources 102 and computes a probability value of 0.41 that the user will deposit money into their bank account. For example, the policy generator 110 may analyze the customer's speech when conversing with other people in line and determine that the customer has stated that they need to withdraw money. Therefore, the policy generator 110 may compute lower probability value of 0.41 reflecting a relatively low likelihood that the user will deposit money at block 218. At block 219, the policy generator 110 computes a probability value of 0.95 that the customer will leave the branch.

Returning to block 220, the policy generator 110 computes a probability value of 0.82 reflecting the likelihood that the customer will open a bank account with their smartphone application. For example, the policy generator 110 may receive data from the environment component 112 which includes video data 121 depicting the user accessing a banking application 124 on their mobile device 103. The policy generator 110 may perform image analysis to determine that the customer is using a portion of the banking application 124 that allows the user to establish a new account. Therefore, the policy generator 110 may compute the probability value reflecting the likelihood that the user will open a new account. At block 221, the policy generator 110 computes a probability value of 0.41 that the customer will submit a rating of the smartphone app. At block 222, the policy generator 110 computes a probability value of 0.74 that the customer will leave the branch. For example, the policy generator 110 may analyze video data 121 from the data sources 102 to determine the customer is speaking to a representative and analyze audio data 122 from the data sources to determine that the customer is exchanging pleasantries with the representative. Therefore, the policy generator 110 may compute the probability value at block 222 based on the received input data.

As stated, the policy generator 110 may further define a policy for a task based on the probability values computed in FIG. 2B. For example, the policy generator 110 may select one or more of the actions associated with blocks 212-222 for inclusion in the policy based on the computed probability values. In one embodiment, the policy generator selects the actions having the greatest probability values for a given branch of the action workflows represented in blocks 212-222. In some embodiments, the policy may be programmatically implemented, e.g., by updating an application configuration based on the policy actions, executing the actions in a compiler, updating a computing configuration based on the policy actions, updating workflows, and the like.

Figure 2C:
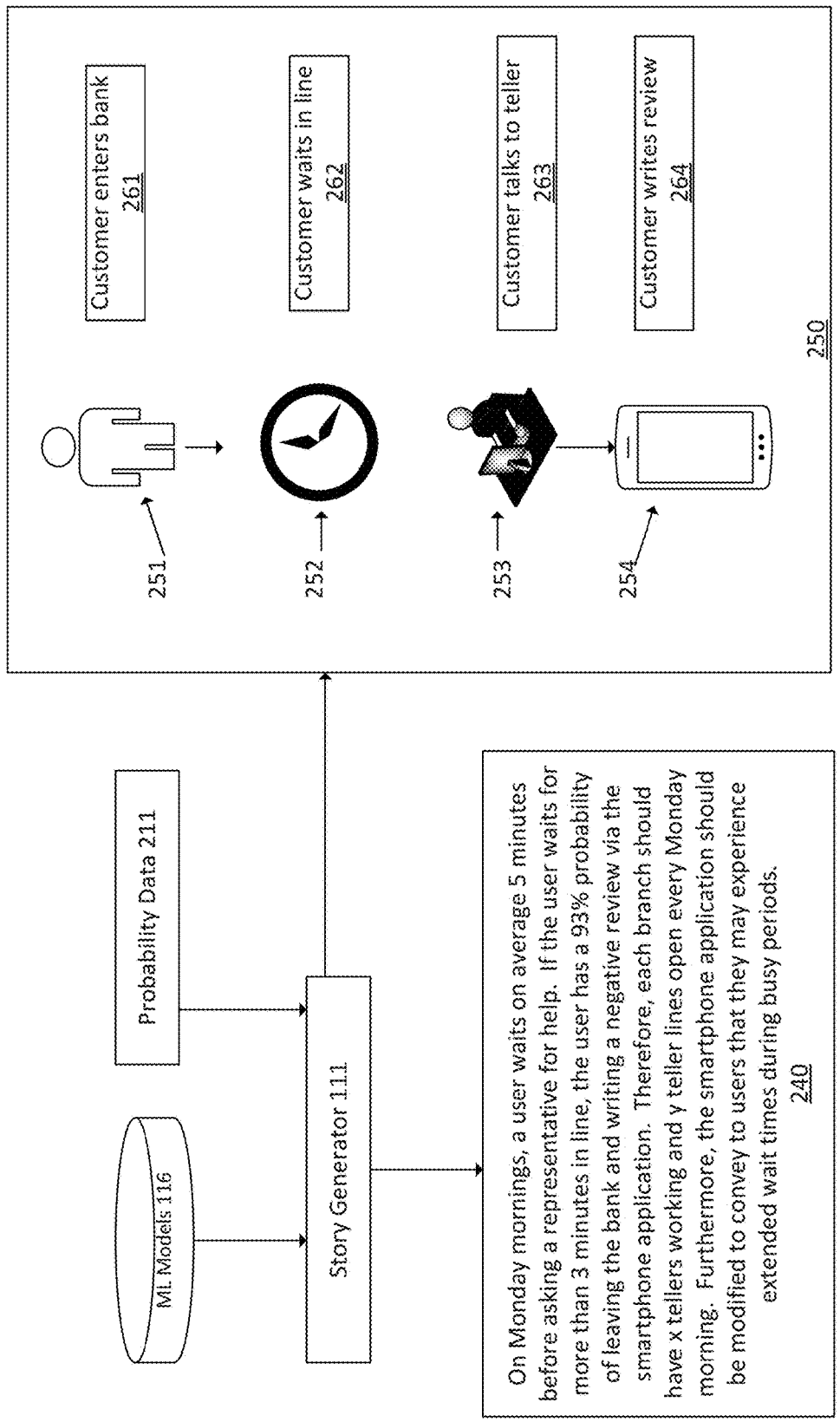

FIG. 2C is a schematic 230 depicting example operations of the story generator 111 to generate a natural language narration and graphical representation of at least a portion of a policy, according to one embodiment. As shown, the story generator 111 receives one or more ML models 116 that were trained by the policy generator 110 and the probability data 211 generated by the policy generator 110. The particular ML models 116 received by the story generator 111 may correspond to the ML model 116 used by the policy generator 110 to compute probability values for a task (e.g., the ML model 116 used by the policy generator 110 in the example depicted in FIG. 2B). The probability data 211 reflects the probability values generated by the policy generator 110 for the task (e.g., the probability values computed by the policy generator 110 in the example depicted in FIG. 2B).

Based on the received ML models 116 and the probability data 211, the story generator 111 generates a natural language narrative 240 and a graphical narrative 250. The story generator 111 may apply natural language processing (NLP) and/or natural language generation (NLG) techniques to extract concepts from the ML models 116 and/or the probability data 211 and generate the natural language narrative 240 based on the extracted concepts. For example, the story generator 111 may assign each action in the probability data 211 (e.g., the action corresponding to the blocks 212-222 in FIG. 2B) to a verb, and the state of the action may be assigned to a set of entity names representing the context where the action occurred. The story generator 111 may further assign each action in the probability data 211 to a graphical symbol for the action. As shown, the graphical narrative 250 includes four example symbols 251-254, and a brief narrative 261-24 for the corresponding symbols 251-254.

In at least one embodiment, the graphical narrative 250 and associated actions may be executed in a computing environment, such as a complier, a video game, and the like. In such embodiments, the actions of the policy may be implemented using the graphical narrative 250 to improve the performance of a computing system and/or computing application.

Figure 3:
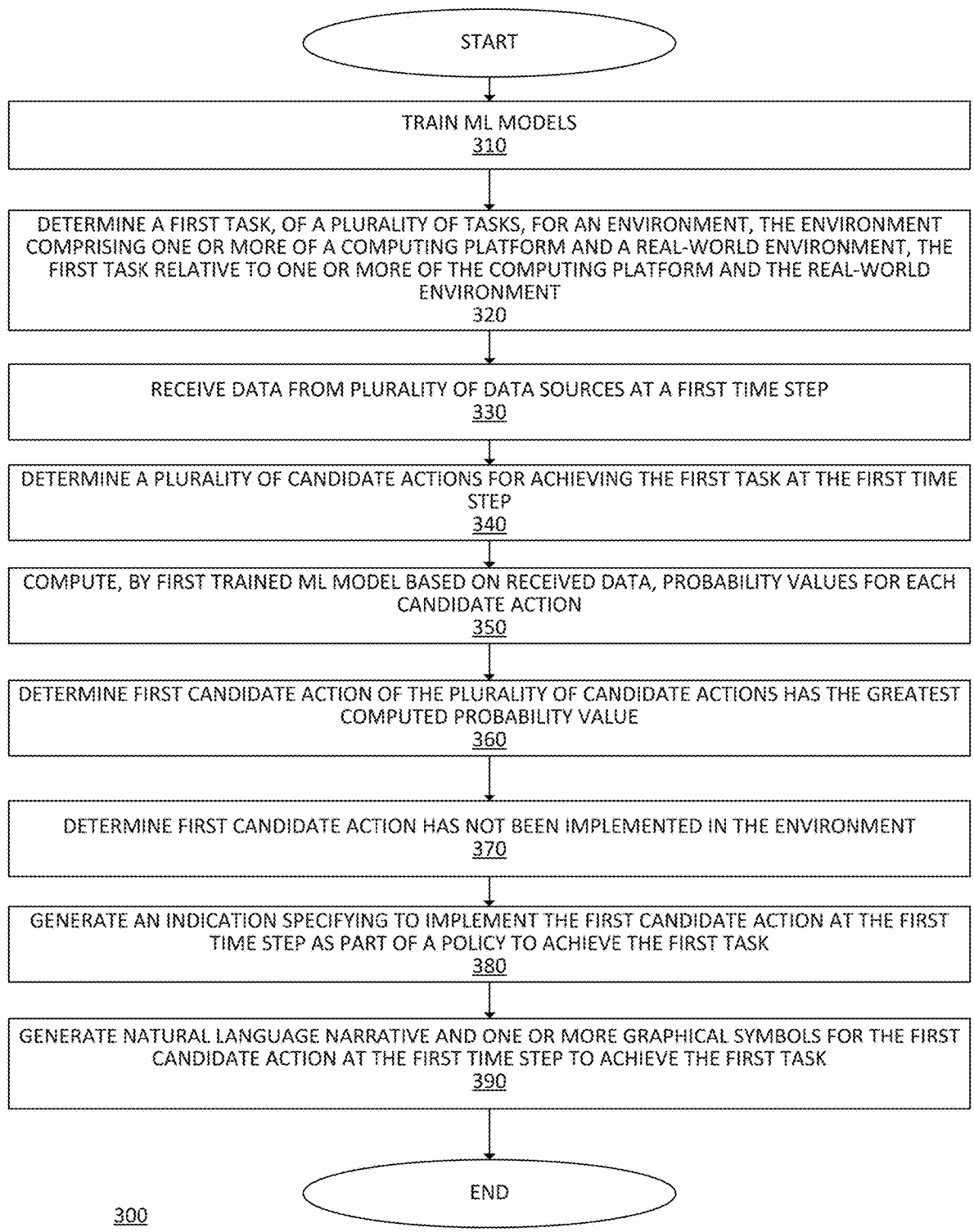
FIG. 3 illustrates an embodiment of a first logic flow.

FIG. 3 illustrates an embodiment of a logic flow 300. The logic flow 300 may be representative of some or all of the operations executed by one or more embodiments described herein. For example, the logic flow 300 may include some or all of the operations to train an ML model 116, generate a policy based on the ML model 116, and generate a story describing the policy in natural language and/or graphical symbols. Embodiments are not limited in this context.

As shown, the logic flow 300 begins at block 310, where the policy generator 110 trains one or more ML models 116. Generally, for a given task, one or more ML models 116 may be trained. For example, a first ML model for a task may predict the optimal sequence of actions needed to complete a task. A second ML model may include ML models used by the story generator 111 to narrate the execution of the sequence of actions determined by the first ML model. At block 320, the policy generator 110 determines a first task, of a plurality of tasks for an environment. The environment may be one or more of a real-world environment and a computing platform (e.g., a computing system, computing application, etc.). In at least one embodiment, a user provides input specifying the first task. The first task may be relative to the computing platform and the real-world environment. For example, the user may define the first task to include attaining a customer satisfaction rate that exceeds a threshold. As another example, the user may define the first task to include improving the performance of a banking application.

At block 330, the environment component 112 receives data from the data sources 102 at a first time step. As stated, the data may include at least the video data 121, audio data 122, text data 123, and any other type of data (e.g., data generated by applications 124). At block 340, the policy generator 110 determines a plurality of candidate actions for achieving the first task at the first time step. In at least one embodiment, the candidate actions are determined based on the ML model 116 for the task. At block 350, the policy generator 110 computes probability values for each candidate action based on the input data received at block 330 and the ML model 116 for the task. The probability values may include a probability value that the candidate action will be performed and/or a probability value that the candidate action will lead to completion of the task. At block 360, the policy generator 110 determines a first candidate action of the plurality of candidate actions has the greatest computed probability values.

At block 370, the policy generator 110 optionally determines that the first candidate action has not been implemented in the environment. For example, the policy generator 110 may compare an actual location of an input field in an application to a proposed location specified by the candidate action. If the actual and proposed locations do not match, the policy generator 110 determines that the candidate action has not been implemented in the computing environment. At block 380, the policy generator 110 generates an indication specifying to implement the first candidate action at the first time step as part of a policy to achieve the first task. For example, the policy generator 110 may update a policy model in the ML models 116 for the task to reflect that the location of the input field should be changed. At block 390, the story generator 111 generates a natural language narrative (e.g., the natural language narrative 240) and one or more graphical symbols (e.g., the graphical narrative 250) for the first candidate action at the first time step to achieve the first task. Generally, the policy generator 110 and the story generator 111 may execute additional iterations of one or more blocks of the logic flow 300 (e.g., blocks 320-390) to determine additional actions at additional time steps to generate a complete policy comprising a sequence of candidate actions. The story generator 111 may then generate a natural language narrative and graphical narrative for the sequence of candidate actions for the completed policy.

Figure 4:
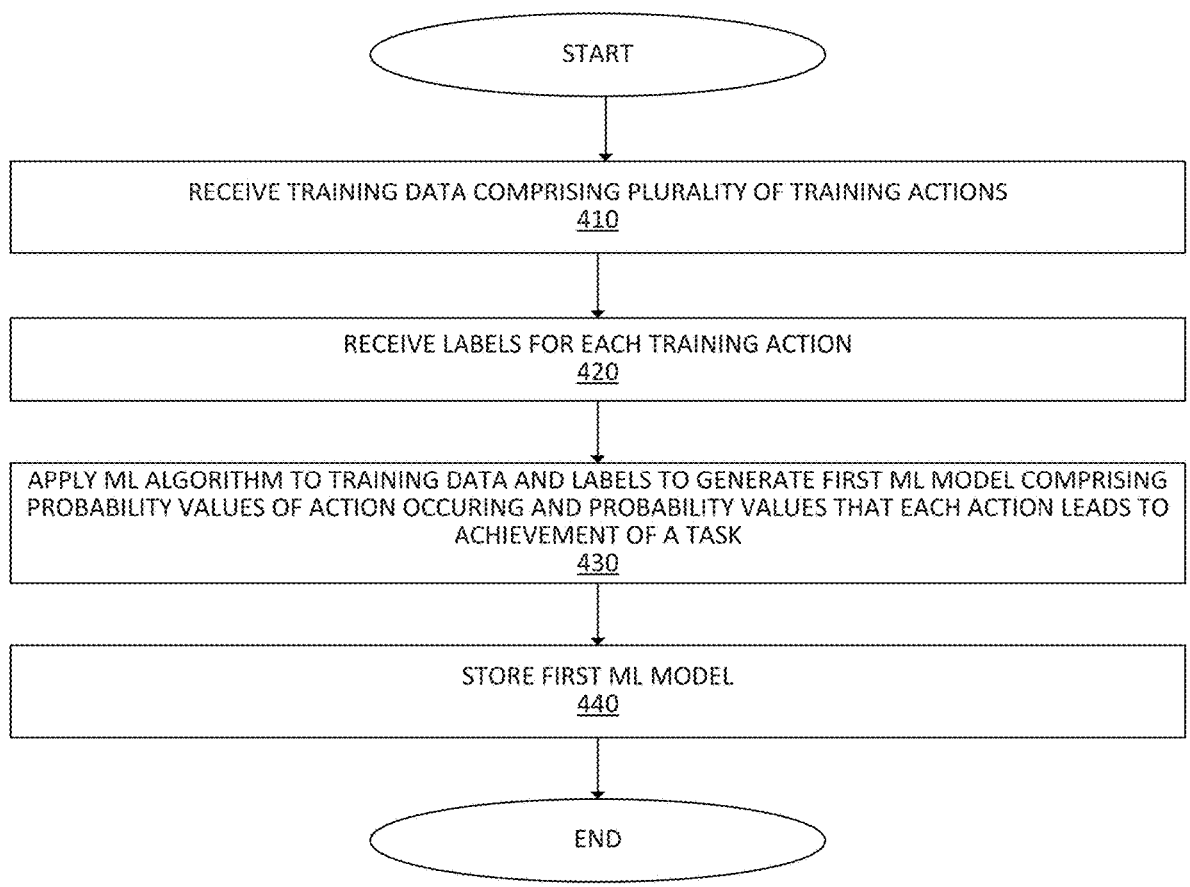
FIG. 4 illustrates an embodiment of a second logic flow.

FIG. 4 illustrates an embodiment of a logic flow 400. The logic flow 400 may be representative of some or all of the operations executed by one or more embodiments described herein. For example, the logic flow 400 may include some or all of the operations to train an ML model 116. Embodiments are not limited in this context.

As shown, the logic flow 400 begins at block 410, where the policy generator 110 receives training data 114 comprising a plurality of training actions. As stated, the training data may include real-world actions, computing actions, etc. At block 420, a user may provide labels for each training action in the training data 114. The user may provide the labels to indicate whether the action leads to the completion of a task. At block 430, the policy generator 110 applies an ML algorithm 113 to the training data 114 to generate a first ML model 116 for the task. The first ML model 116 may include one or more values for a plurality of candidate actions. The values may include, for example, a probability value that the candidate action leads to the performance of a task and/or a probability value that the candidate action will be performed. At block 440, the policy generator 110 stores the first ML model in the ML models 116.

Figure 5:
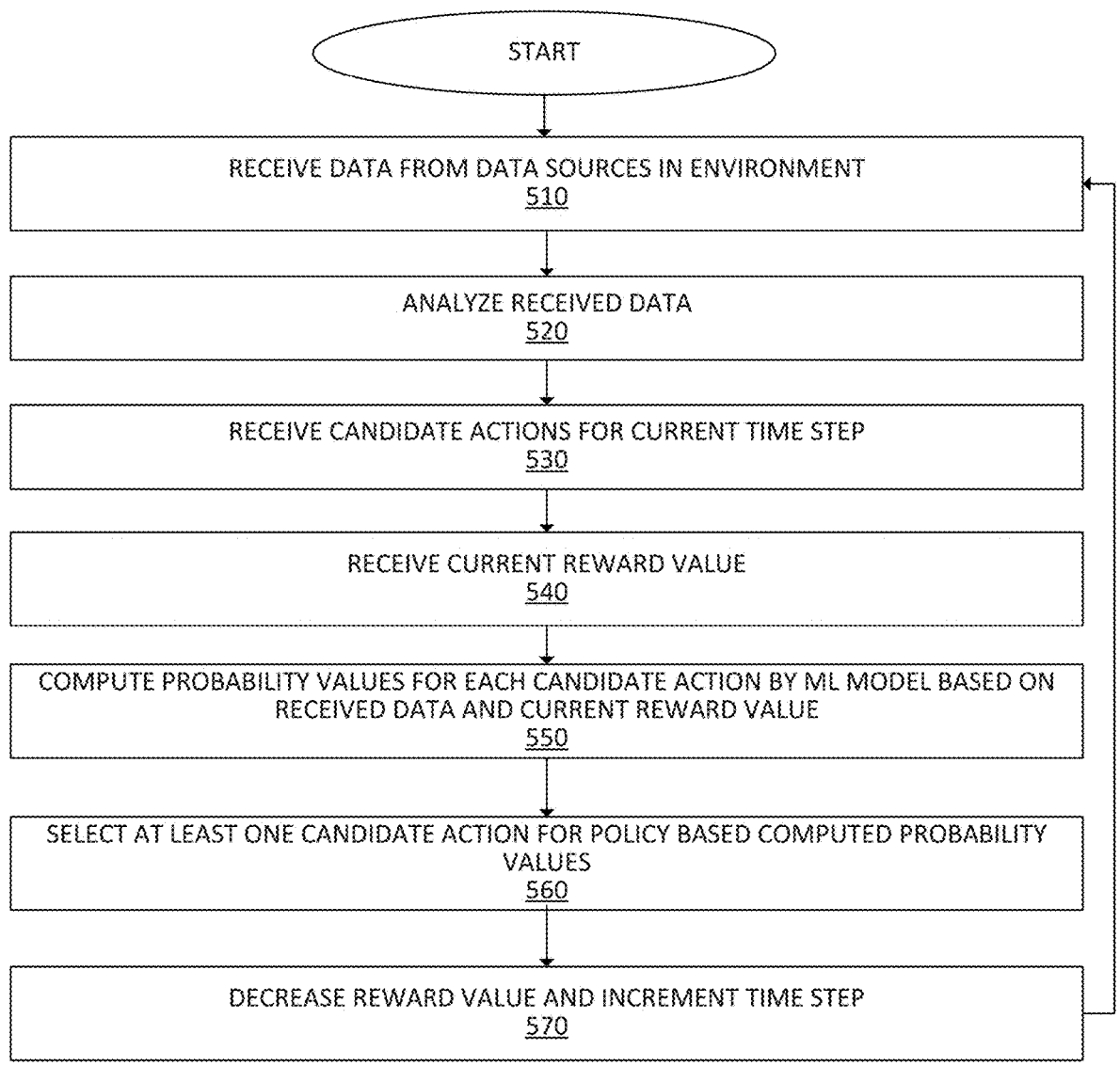
FIG. 5 illustrates an embodiment of a third logic flow.

FIG. 5 illustrates an embodiment of a logic flow 500. The logic flow 500 may be representative of some or all of the operations executed by one or more embodiments described herein. For example, the logic flow 500 may include some or all of the operations performed by the policy generator 110 to generate a policy to complete a task. Embodiments are not limited in this context.

As shown, the logic flow 500 begins at block 510, where the environment component 112 receives data from the data sources 102, such as video data 121, audio data 122, and text data 123. The received data may also include application data, log data, and any other type of computer-generated data. At block 520, the policy generator 110 analyzes the received data. For example, the policy generator 110 may apply computer vision algorithms to the images in the video data, speech-to-text algorithms to convert speech in the audio data 122 to text, NLP algorithms to text data 123 to extract concepts from chat logs, etc. At block 530, the policy generator 110 receives a plurality of candidate actions for the current time step from the trained ML model 116 for the task. At block 540, the policy generator 110 receives a current reward value, which may be initialized to a value of 0.99, and decreases over each iteration of the logic flow 500. At block 550, the policy generator 110 computes probability values for each candidate action using the ML model 116 for the task, the analyzed data, and the current reward value. The probability values may include, for example, a probability value that the candidate action leads to the performance of a task and/or a probability value that the candidate action will be performed during the current time step.

At block 560, the policy generator 110 selects at least one candidate action for inclusion in the policy for the task. The policy generator 110 may select the candidate actions based on the computed probability values, e.g., the candidate actions having the greatest probability values, the candidate actions having probability values exceeding a threshold value, etc. At block 570, the policy generator 110 decreases the reward value by a predefined amount and increments the time step. The logic flow 500 may then return to block 510, to complete additional iterations of the logic flow 500. Doing so allows the policy generator 110 to generate a complete policy for the task and predict actions at each time step.

Figure 6:
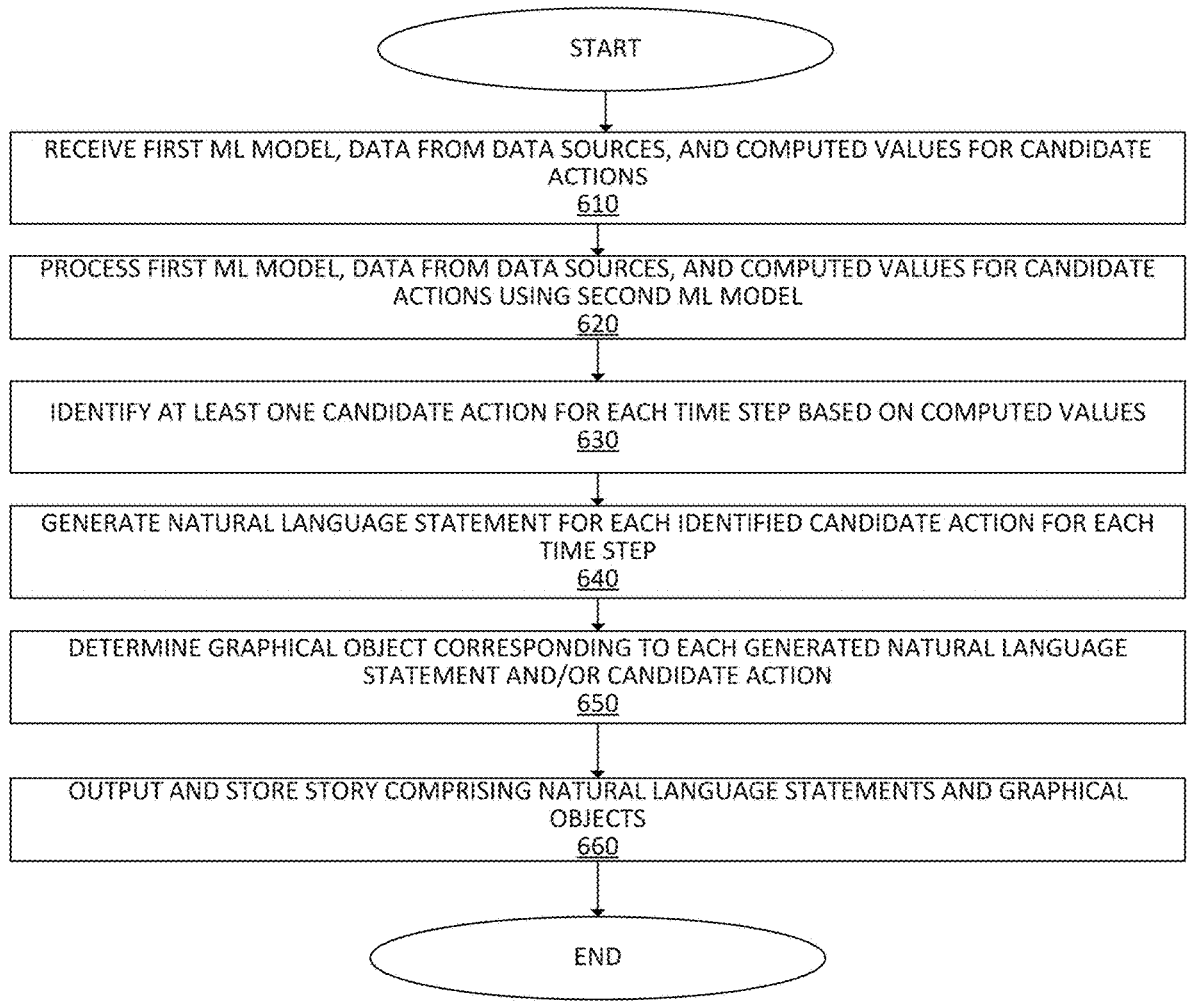
FIG. 6 illustrates an embodiment of a fourth logic flow.

FIG. 6 illustrates an embodiment of a logic flow 600. The logic flow 600 may be representative of some or all of the operations executed by one or more embodiments described herein. For example, the logic flow 600 may include some or all of the operations to generate a story describing a policy in natural language and/or graphical symbols. Embodiments are not limited in this context.

As shown, the logic flow 600 includes block 610, where the story generator 111 receives a first ML model 116, data from the data sources 102, and/or values computed by the policy generator 110 for a plurality of candidate actions. The first ML model 116 may be the ML model 116 trained by the policy generator 110 for a given task, and the probability values may be the probability values generated by the policy generator 110 based on the data from the data sources 102 for each of the candidate tasks. At block 620, the story generator 111 processes the first ML model 116, the data from the data sources 102, and the probability values for each candidate action using a second ML model 116. In at least one embodiment, the story generator 111 is the second ML model 116. At block 630, the story generator 111 identifies at least one candidate action for each time step based on the received probability values (e.g., the highest probability value at each time step).

At block 640, the story generator 111 generates a natural language statement for each candidate action identified at block 630. As stated, the story generator 111 may apply an NLG algorithm which assigns each candidate action to a verb, and the state of the action to a set of entity names representing the context where the action took place. Collectively, the natural language statements form a natural language narrative describing the actions for the policy. At block 650, the story generator 111 determines one or more graphical objects corresponding to each generated natural language statement and/or each candidate action identified at block 630. As stated, the story generator 111 may assign each action to one or more graphical symbols (e.g., from a data store of symbols). Collectively, the graphical symbols represent each action in the policy and form the graphical narrative for the policy. At block 660, the story generator 111 outputs the story for the policy, which includes the natural language statements and/or the graphical symbols. The story generator 111 may further store the story in the story data 117.

Figure 7:
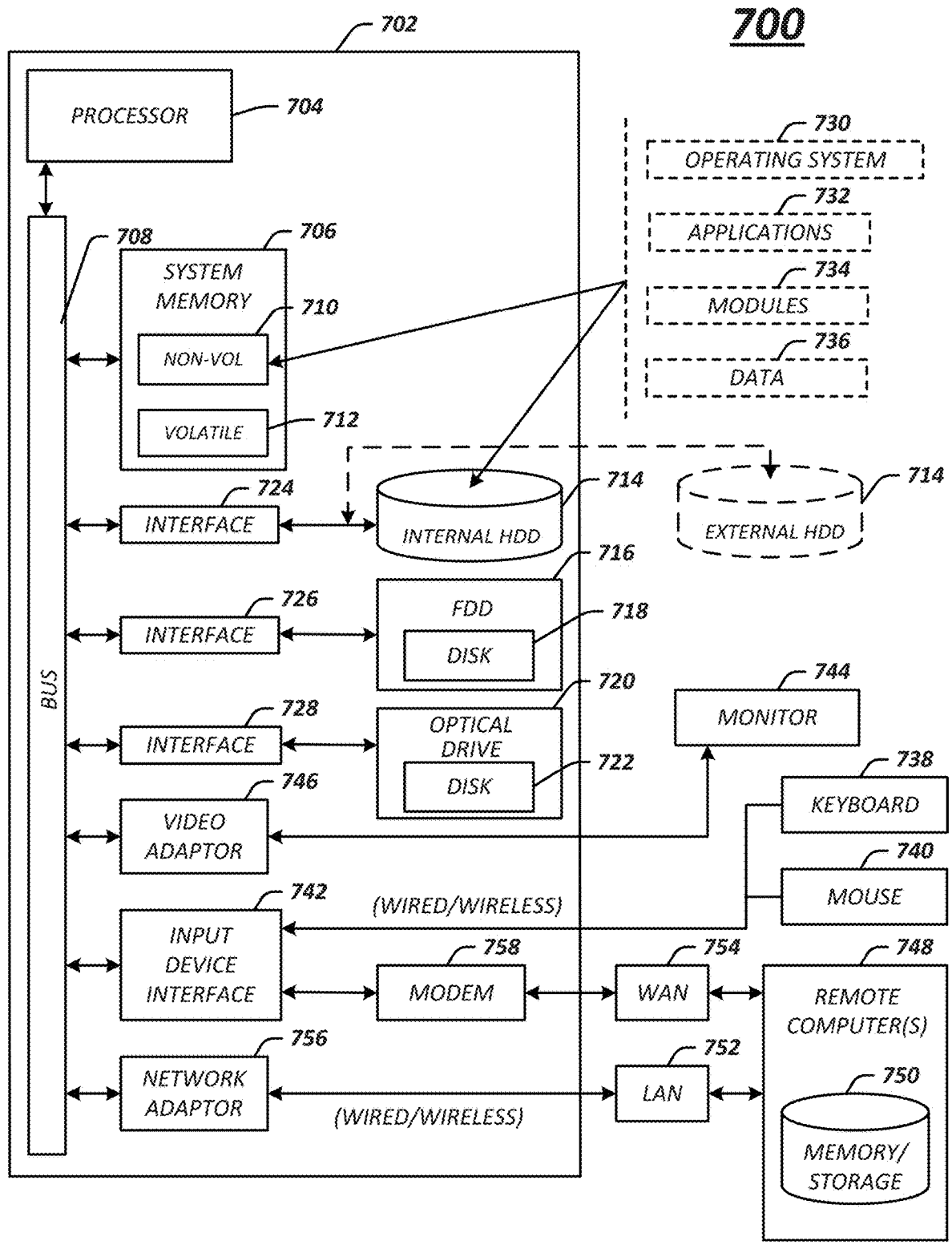
FIG. 7 illustrates an embodiment of a computing architecture.

FIG. 7 illustrates an embodiment of an exemplary computing architecture 700 comprising a computing system 702 that may be suitable for implementing various embodiments as previously described. In various embodiments, the computing architecture 700 may comprise or be implemented as part of an electronic device. In some embodiments, the computing architecture 700 may be representative, for example, of a system that implements one or more components of the system 100. In some embodiments, computing system 702 may be representative, for example, of the computing system 101, data sources 102, and client device 103 of the system 100. The embodiments are not limited in this context. More generally, the computing architecture 700 is configured to implement all logic, applications, systems, methods, apparatuses, and functionality described herein with reference to FIGS. 1-6.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 702 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 702.

As shown in FIG. 7, the computing system 702 comprises a processor 704, a system memory 706 and a system bus 708. The processor 704 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 704.

The system bus 708 provides an interface for system components including, but not limited to, the system memory 706 to the processor 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computing system 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies. The computing system 702 is generally is configured to implement all logic, systems, methods, apparatuses, and functionality described herein with reference to FIGS. 1-6.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100, e.g., the policy generator 110, story generator 111, environment component 112, ML algorithm 113, training data 114, input data 115, ML models 116, story data 117, video data 121, text data 123, and applications 124.

A user can enter commands and information into the computing system 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computing system 702. In addition to the monitor 744, a computer typically includes other peripheral output devices, such as speakers, printers, and so forth.

The computing system 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computing system 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 752 and the WAN 754.

When used in a LAN networking environment, the computing system 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computing system 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computing system 702, or portions thereof, can be stored in the remote memory/storage device 750. It will be appreciated that the network connections shown are exemplary and other means of establishing a communications link between the computers can be used.

The computing system 702 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A system, comprising:
 a processor circuit; and
 a memory storing instructions which when executed by the processor circuit cause the processor circuit to:
   determine a first task, of a plurality of tasks, for an environment, the environment comprising one or more of a computing environment and a real-world environment, the first task relative to one or more of the computing environment and the real-world environment;
   receive data from a plurality of data sources, the received data comprising audio data, image data, application data, and text data;
   extract a plurality of features from the received data, the plurality of features comprising: objects identified in the image data, natural language concepts extracted from the audio data, and natural language concepts extracted from the text data;
   determine a first time step associated with the received data;
   determine a plurality of candidate actions for the determined first time step;
   compute a respective first probability value of each candidate action achieving the first task at the first time step based on a first machine learning (ML) model applied to the received data and the plurality of features, the first ML model trained based on training data labeled to specify that the training data achieves each of the plurality of tasks or the training data does not achieve each of the plurality of tasks;
   determine that a first candidate action of the plurality of candidate actions has a greater first probability value for achieving the first task at the first time step relative to the first probability values of the remaining plurality of candidate actions;
   determine that the first candidate action has not been implemented in the environment at the first time step;
   compute, based on the first ML model, a second probability value for the first candidate action, the second probability value reflecting a likelihood that the first candidate action will occur in the real-world environment at the first time step;
   generate, based on the first and second probability values of the first candidate action, an indication specifying to implement the first candidate action at the first time step as part of a policy to achieve the first task;
   generate, by a second ML model and based on the first ML model, the first candidate action, the second probability value, the received data from the plurality of data sources, and the plurality of features, a natural language narrative describing the first candidate action and the second probability value for the first candidate action, the natural language narrative comprising a plurality of graphical symbols associated with a plurality of natural language concepts of the natural language narrative, the plurality of natural language concepts of the natural language narrative comprising at least one of the natural language concepts extracted from the audio data and at least one of the natural language concepts extracted from the text data;
   compute, based on the first ML model, a review probability value reflecting whether a user will submit a review of an application in the computing environment; and
   update the training data based on the review probability value.

2. The system of claim 1, wherein the plurality of features further comprise user sentiment, wherein the natural language narrative is further based on the remaining plurality of candidate actions and the remaining probability values, the memory storing instructions which when executed by the processor circuit cause the processor circuit to:

receive, by the second ML model, the first ML model, the plurality of candidate actions, the computed probability values, and the received data from the plurality of data sources, the plurality of data sources comprising microphones, cameras, and computing devices;

output the natural language narrative for display; and retrain the first ML model based on the updated training data.

3. The system of claim 2, the memory storing instructions which when executed by the processor circuit cause the processor circuit to:

generate a text transcription of speech in the audio data;

extract the natural language concepts from the text transcription to extract the natural language concepts from the audio data;

determine, by the second ML model for each of the plurality of natural language concepts of the natural language narrative, an associated graphical symbol of the plurality of graphical symbols;

select, by the second ML model, a first graphical symbol of the plurality of graphical symbols; and assign the first graphical symbol to the first candidate action.

4. The system of claim 1, wherein the first ML model comprises an artificial neural network, the memory storing instructions which when executed by the processor circuit cause the processor circuit to, prior to determining the first task:

receive the training data comprising a plurality of training actions, at least a subset of the plurality of training actions comprising sequential actions, the training data further comprising a plurality of online chat transcripts;

receive the labels for the training data, the labels comprising values indicating whether the associated training action achieves the plurality of tasks, the labels further comprising values indicating whether an automated bot associated with each chat transcript resolved a customer complaint; and train the first ML model based on the training data, the labels, and a ML algorithm.

5. The system of claim 1, the memory storing instructions which when executed by the processor circuit cause the processor circuit to:

receive data from the plurality of data sources at a second time step, the second time step subsequent to the first time step;

determine a second task of the plurality of tasks;

determine a plurality of candidate actions for the second time step;

compute, by the first ML model based on the data received at the second time step, a respective third probability value for each candidate action for the second time step, the third probability values reflecting the probability that the associated candidate action for the second time step achieves the second task at the second time step;

determine that a second candidate action of the plurality of candidate actions for the second time step has a greater third probability value for achieving the second task at the second time step relative to the third probability values of the remaining plurality of candidate actions for the second time step;

determine that the second candidate action has not been implemented in the environment at the second time step;

generate the policy comprising the first and second candidate actions; and generate an indication specifying to implement the second candidate action at the second time step as part of the policy to achieve the second task.

6. The system of claim 1, the memory storing instructions which when executed by the processor circuit cause the processor circuit to:

receive, by the first ML model, a reward value for the first time step, the reward value lesser than a reward value for a time step prior to the first time step, wherein the first ML model further determines the first and second probability values based on the reward value for the first time step;

compute, based on the first ML model, a respective second probability value for each remaining candidate action of the plurality of candidate actions; and determine that the second probability value for the first candidate action is greater than the second probability values of the remaining plurality of candidate actions.

7. The system of claim 1, wherein the first task is determined based on one or more of user input and the first ML model, wherein the first candidate action comprises one or more of: (i) modifying the real-world environment, and (ii) performing an operation in the real-world environment.

8. A non-transitory computer-readable storage medium storing instructions that when executed by a processor of a computing device, cause the processor to:

determine a first task, of a plurality of tasks, for an environment, the environment comprising one or more of a computing environment and a real-world environment, the first task relative to one or more of the computing environment and the real-world environment;

receive data from a plurality of data sources, the received data comprising audio data, image data, application data, and text data;

extract a plurality of features from the received data, the plurality of features comprising: objects identified in the image data, natural language concepts extracted from the audio data, and natural language concepts extracted from the text data;

determine a first time step associated with the received data;

determine a plurality of candidate actions for the determined first time step;

compute a respective first probability value of each candidate action achieving the first task at the first time step based on a first machine learning (ML) model applied to the received data and the plurality of features, the first ML model trained based on training data labeled to specify that the training data achieves each of the plurality of tasks or the training data does not achieve each of the plurality of tasks;

determine that a first candidate action of the plurality of candidate actions has a greater first probability value for achieving the first task at the first time step relative to the first probability values of the remaining plurality of candidate actions;

determine that the first candidate action has not been implemented in the environment at the first time step;

compute, based on the first ML model, a second probability value for the first candidate action, the second probability value reflecting a likelihood that the first candidate action will occur in the real-world environment at the first time step;

generate, based on the first and second probability values of the first candidate action, an indication specifying to implement the first candidate action at the first time step as part of a policy to achieve the first task;

generate, by a second ML model based on the first ML model, the plurality of candidate actions, the probability values, the received data from the plurality of data sources, and the plurality of features, a natural language narrative describing the first candidate action and the second probability value for the first candidate action, the natural language narrative comprising a plurality of graphical symbols associated with a plurality of natural language concepts of the natural language narrative, the plurality of natural language concepts of the natural language narrative comprising at least one of the natural language concepts extracted from the audio data and at least one of the natural language concepts extracted from the text data;

compute, based on the first ML model, a review probability value reflecting whether a user will submit a review of an application in the computing environment; and update the training data based on the review probability value.

9. The non-transitory computer-readable storage medium of claim 8, wherein the plurality of features further comprise user sentiment, the medium further storing instructions that when executed by the processor cause the processor to:

receive data from the plurality of data sources at a second time step, the second time step subsequent to the first time step;

determine a plurality of candidate actions for the second time step;

compute, by the first ML model based on the data received at the second time step, a respective third probability value for each candidate action for the second time step, the third probability values reflecting the probability that the associated candidate action for the second time step achieves a second task at the second time step;

determine that a second candidate action of the plurality of candidate actions for the second time step has a greater third probability value for achieving the second task at the second time step relative to the third probability values of the remaining plurality of candidate actions for the second time step;

determine that the second candidate action has not been implemented in the environment at the second time step;

generate the policy comprising the first and second candidate actions; and generate an indication specifying to implement the second candidate action at the second time step as part of the policy to achieve the first task.

10. The non-transitory computer-readable storage medium of claim 9, wherein the natural language narrative is further based on the remaining plurality of candidate actions and the remaining probability values, further storing instructions that when executed by the processor cause the processor to:

receive, by the second ML model, the first ML model, the plurality of candidate actions, the computed probability values, and the received data from the plurality of data sources, the plurality of data sources comprising microphones, cameras, and computing devices; and output the natural language narrative for display.

11. The non-transitory computer-readable storage medium of claim 10, further storing instructions that when executed by the processor cause the processor to:

generate a text transcription of speech in the audio data;

extract the natural language concepts from the text transcription to extract the natural language concepts from the audio data;

determine, by the second ML model for each of the plurality of natural language concepts of the natural language narrative, an associated graphical symbol of the plurality of graphical symbols;

select, by the second ML model, a first graphical symbol of the plurality of graphical symbols; and assign the first graphical symbol to the first candidate action.

12. The non-transitory computer-readable storage medium of claim 8, further storing instructions that when executed by the processor cause the processor to, prior to determining the first task:

receive the training data comprising a plurality of training actions, at least a subset of the plurality of training actions comprising sequential actions, the training data further comprising a plurality of online chat transcripts;

receive the labels for the training data, the labels comprising values indicating that the associated training action achieves the plurality of tasks or does not achieve the plurality of tasks, the labels further comprising values indicating whether an automated bot associated with each chat transcript resolved a customer complaint; and train the first ML model based on the training data, the labels, and a ML algorithm, wherein the first ML model comprises an artificial neural network.

13. The non-transitory computer-readable storage medium of claim 8, further storing instructions that when executed by the processor cause the processor to:

receive, by the first ML model, a reward value for the first time step, the reward value lesser than a reward value for a time step prior to the first time step, wherein the first ML model further determines the first and second probability values based on the reward value for the first time step;

compute, based on the first ML model, a respective second probability value for each remaining candidate action of the plurality of candidate actions; and determine that the second probability value for the first candidate action is greater than the second probability values of the remaining plurality of candidate actions.

14. The non-transitory computer-readable storage medium of claim 8, wherein the first task is determined based on one or more of user input and the first ML model, wherein the first candidate action comprises one or more of: (i) modifying the real-world environment, and (ii) performing an operation in the real-world environment.

15. A method, comprising:

determining a first task, of a plurality of tasks, for an environment, the environment comprising one or more of a computing environment and a real-world environment, the first task relative to one or more of the computing environment and the real-world environment;

receiving data from a plurality of data sources, the received data comprising audio data, image data, application data, and text data;

extracting a plurality of features from the received data, the plurality of features comprising: objects identified in the image data, natural language concepts extracted from the audio data, and natural language concepts extracted from the text data;

determining a first time step associated with the received data;

determining a plurality of candidate actions for the determined first time step;

computing a respective first probability value of each candidate action achieving the first task at the first time step based on a first machine learning (ML) model applied to the received data and the plurality of features, the first ML model trained based on training data labeled to specify that the corresponding training data achieves each of the plurality of tasks or the training data does not achieve each of the plurality of tasks;

determining that a first candidate action of the plurality of candidate actions has a greater first probability value for achieving the first task at the first time step relative to the first probability values of the remaining plurality of candidate actions;

determining that the first candidate action has not been implemented in the environment at the first time step;

computing, based on the first ML model, a second probability value for the first candidate action, the second probability value reflecting a likelihood that the first candidate action will occur in the real-world environment at the first time step;

generating, based on the first and second probability values of the first candidate action, an indication specifying to implement the first candidate action at the first time step as part of a policy to achieve the first task;

generating, by a second ML model and based on the first ML model, the first candidate action, the second probability value, the received data from the plurality of data sources, and the plurality of features, a natural language narrative describing the first candidate action and the second probability value for the first candidate action, the natural language narrative comprising a plurality of graphical symbols associated with a plurality of natural language concepts of the natural language narrative, the plurality of natural language concepts of the natural language narrative comprising at least one of the natural language concepts extracted from the audio data and at least one of the natural language concepts extracted from the text data;

computing, based on the first ML model, a review probability value reflecting whether a user will submit a review of an application in the computing environment; and updating the training data based on the review probability value.

16. The method of claim 15, wherein the plurality of features further comprise user sentiment, wherein the natural language narrative is further based on the remaining plurality of candidate actions and the remaining probability values, the method further comprising:

receiving, by the second ML model, the first ML model, the plurality of candidate actions, the computed probability values, and the received data from the plurality of data sources, the plurality of data sources comprising microphones, cameras, and computing devices; and outputting the natural language narrative for display.

17. The method of claim 16, further comprising:

generating a text transcription of speech in the audio data;

extracting the natural language concepts from the text transcription to extract the natural language concepts from the audio data;

determining, by the second ML model for each of the plurality of natural language concepts of the natural language narrative, an associated graphical symbol of the plurality of graphical symbols;

selecting, by the second ML model, a first graphical symbol of the plurality of graphical symbols; and assigning the first graphical symbol to the first candidate action.

18. The method of claim 15, wherein the first ML model comprises an artificial neural network, the method further comprising prior to determining the first task:

receiving the training data comprising a plurality of training actions, at least a subset of the plurality of training actions comprising sequential actions, the training data further comprising a plurality of online chat transcripts;

receiving the labels for the training data, the labels comprising values indicating that the associated training action achieves the plurality of tasks or does not achieve the plurality of tasks, the labels further comprising values indicating whether an automated bot associated with each chat transcript resolved a customer complaint; and training the first ML model based on the training data, the labels, and a ML algorithm.

19. The method of claim 15, further comprising:

receiving data from the plurality of data sources at a second time step, the second time step subsequent to the first time step;

determining a second task of the plurality of tasks;

determining a plurality of candidate actions for the second time step;

computing, by the first ML model based on the data received at the second time step, a respective third probability value for each candidate action for the second time step, the third probability values reflecting the probability that the associated candidate action for the second time step achieves the second task at the second time step;

determining that a second candidate action of the plurality of candidate actions for the second time step has a greater third probability value for achieving the second task at the second time step relative to the third probability values of the remaining plurality of candidate actions for the second time step;

determining that the second candidate action has not been implemented in the environment at the second time step;

generating the policy comprising the first and second candidate actions; and generating an indication specifying to implement the second candidate action at the second time step to achieve the second task.

20. The method of claim 15, wherein the first task is determined based on one or more of user input and the first ML model, wherein the first candidate action comprises one or more of: (i) modifying the real-world environment, and (ii) performing an operation in the real-world environment, the method further comprising:

receiving, by the first ML model, a reward value for the first time step, the reward value lesser than a reward value for a time step prior to the first time step, wherein the first ML model further determines the first and second probability values based on the reward value for the first time step;

computing, based on the first ML model, a respective second probability value for each remaining candidate action of the plurality of candidate actions; and determining that the second probability value for the first candidate action is greater than the second probability values of the remaining plurality of candidate actions.

\* \* \* \* \*